United States Patent [19]

Greenwood

[11] 3,888,764
[45] June 10, 1975

[54] CATALYST PURGING TECHNIQUE IN AN ON-STREAM CATALYST REGENERATION PROCESS

[75] Inventor: Arthur R. Greenwood, Niles, Ill.

[73] Assignee: Universal Oil Products Company, Des Plaines, Ill.

[22] Filed: July 30, 1973

[21] Appl. No.: 383,753

Related U.S. Application Data

[63] Continuation-in-part of Ser. No. 194,030, Oct. 29, 1971, abandoned.

[52] U.S. Cl. ............... 208/140; 208/151; 252/411
[51] Int. Cl. ............................................... B01j 11/02
[58] Field of Search ............ 208/140, 150, 151, 168; 252/411, 417, 418; 55/62

[56] References Cited
UNITED STATES PATENTS

| | | | |
|---|---|---|---|
| 2,259,485 | 10/1941 | Plummer | 208/150 |
| 2,688,195 | 9/1954 | Hyer | 208/150 |
| 2,833,699 | 5/1958 | Dicks | 208/150 |

*Primary Examiner*—Delbert E. Gantz
*Assistant Examiner*—S. Berger
*Attorney, Agent, or Firm*—James R. Hoatson, Jr.; Robert W. Erickson; William H. Page

[57] ABSTRACT

A method for purging hydrogen and hydrocarbonaceous material from catalyst particles utilized in a hydrogenative hydrocarbon conversion process, which catalyst particles are removed from a hydrocarbon conversion zone and transported to an on-stream oxidative catalyst regeneration facility, or from the regeneration facility to a hydrocarbon conversion zone.

5 Claims, No Drawings

CATALYST PURGING TECHNIQUE IN AN ON-STREAM CATALYST REGENERATION PROCESS

RELATED APPLICATION

The present application is a continuation-in-part of my abandoned application, Ser. No. 194,030, filed Oct. 29, 1971, all the teachings of which copending application are incorporated herein by specific reference thereto.

APPLICABILITY OF INVENTION

My invention affords a method for purging a hydrocarbon conversion catalyst of volatile matter such as hydrogen and hydrocarbonaceous material, or oxygen, etc. More particularly, the inventive concept described herein is directed toward a method for removing volatile material from a reforing catalyst prior to the regeneration thereof in an on-stream oxidative catalyst regeneration facility which is integrated with the catalytic reforming process, and, after the regeneration of the catalyst, prior to the return thereof to the reforming process.

Catalysts utilized in hydrocarbon conversion processes typically absorb (or adsorb) volatile materials which must necessarily be removed before introduction thereof into a regeneration facility. Likewise, certain volatile materials must be removed from the regenerated catalyst prior to the return thereof to the hydrocarbon conversion process. These volatile materials include oxygen, feedstock components, products of the conversion reactions and, in most hydrocarbon conversion processes, hydrogen. For example, the catalytic reforming of naphtha fractions, to which the present invention is particularly directed, utilizes a catalyst which, when taken off-stream for the purpose of regeneration, contains hydrogen and various hydrocarbonaceous material. These components must be removed prior to oxidative regeneration, since they increase the amount of material that must be oxidized and may adversely affect the activity of the regenerated catalyst. Additionally, purging is required for safety reasons to avoid an explosive mixture when transferring the catalyst from a hydrogen/hydrocarbon atmosphere to an oxygencontaining atmosphere, or vice versa.

Although applicable to fixed-bed, multiple-stage catalytic conversion systems, in which deactivated catalyst particles are subjected to in situ oxidative regeneration, or swing-bed systems, my invention affords significant advantages in those hydrocarbon conversion systems having an on-stream catalyst regeneration facility integrated therewith, in which systems catalyst particles are movable via gravity-flow, are withdrawn from a hydrogenative conversion zone and transported to the oxidative regeneration facility, and ultimately returned to the conversion zone.

PRIOR ART

Candor compels recognition of the fact that the literature is replete with catalyst regeneration techniques, including schemes for effecting the removal of volatile material, including hydrogen and hydrocarbons, from the catalyst particles intended for regeneration. For example, as practiced in a multitude of fixed-bed conversion zones, the off-stream bed of catalyst is depressured to about atmospheric pressure and simply swept, or purged with an inert gaseous medium such as nitrogen. This method, however, is totally ineffective due to the channeling effect experienced as the purge medium rushes through the catalyst bed. The result is a catalyst which continues to contain a considerable quantity of absorbed hydrogen and hydrocarbons, as well as isolated "dead" spots in the reaction chamber itself. A partial solution to this problem has been the prior art use of a vacuum on the reaction chamber to "pull" out the greater proportion of the remaining hydrogen and hydrocarbonaceous material. The vacuum technique requires a significant amount of additional equipment, including manifolding, as well as a substantially considerable amount of time. This is compounded by virtue of the fact that the steps must be repeated in order to purge the catalyst of oxygen. Aside from extending the duration of down-time, this is not too great a critical consideration in regenerating a fixed-bed system.

However, recent advances in hydrocarbon processing, via the catalytic route, and especially in catalytic reforming, have led to conversion systems wherein the catalyst particles are movable via gravity-flow. Catalyst particles withdrawn from the last reaction zone are transported to the integrated regeneration facility. Such on-stream catalyst regeneration systems are exemplified by U.S. Pat. No. 3,647,680 (Cl. 208–65), U.S. Pat. No. 3,692,496 (Cl. 23–288G) and U.S. Pat. No. 3,725,248 (Cl. 208–138). The catalyst particles are continuously, or at least intermittently (over frequent intervals), withdrawn, regenerated and returned to the reaction system, and the time necessarily required for purging the withdrawn catalyst particles becomes both significant and critical. When compared to the total time which lapses until the catalyst particles are returned to the conversion system, the time consumed in the purging of the catalyst particles becomes a very important consideration. Accordingly, it is important to provide a purge technique which not only insures substantially complete removal of hydrogen and hydrocarbonaceous material on one hand, and oxygen on the other, but one which can be effectively conducted over a shorter period of time. Thus, the purging technique herein described is particularly intended for utilization in hydrocarbon conversion systems in which the catalyst particles are movable, through both the conversion and regeneration zones, via gravity-flow.

As hereinafter more specifically set forth, the purging technique encompassed by my inventive concept involves the repeated cycling of the static pressure imposed upon the purging zone, in which the catalyst particles are disposed, while effecting the purging technique. This insures that the purge gas reaches all parts of the purging zone and thus removes essentially all of the volatile material from the catalyst particles. Furthermore, the repetitive, protracted static-pressure cycling utilizes relatively small incremental quantities of the inert purge gas stream, as contrasted to the large volumes employed in the prior art, while being effectively more successful over a significantly shorter period of time. It must be further noted that the static-pressure cycling herein described avoids and eliminates any fluidization of the catalyst particles within the purging zone.

In addition to the foregoing prior art techniques of purging catalyst particles, other divergent schemes exist. For instance, U.S. Pat. No. 2,259,485 (Cl.

208-150) is concerned with the removal of recoverable hydrocarbon oils from a catalyst. To achieve this end, a normally gaseous hydrocarbon is employed, specifically ethane, propane and/or butane. These are utilized at reaction temperatures and elevated pressures to remove the entrained hydrocarbon oil from the catalyst particles prior to regeneration. When the pressure on the catalyst-containing chamber is reduced, hot flue gas is employed to purge the normally gaseous hydrocarbons.

The catalyst is then regenerated through the use of oxygen, or oxygen-containing gas, and thereafter once again contacted with the hot flue gas to purge the oxygen from the catalyst. All three purges, the first with the gaseous hydrocarbon and two with the hot flue gas, are effected instantaneously through the use of a high-pressure tank (200 to 400 psig.) which, when released to the low-pressure catalyst chamber, creates a sudden on-rush of the purge stream through the catalyst.

It should be noted that there is no recognition of static-pressure cycling, especially as effected at the low pressures herein disclosed. Furthermore, the adverse channeling effect of the sudden, high-pressure purge is precisely one of the disadvantages the invention herein seeks to avoid, and is successful at accomplishing. Such a prior art method would not suffice in the slightest in purging catalyst particles which had been employed in a hydrogen/hydrocarbon atmosphere, prior to the introduction thereof into an oxidative regeneration facility. Furthermore, especially respecting the transfer of regenerated catalyst particles back to the conversion system, in which instance oxygen must be purged, great care must be exercised in order to avoid creating an atmosphere detrimental to catalyst activity and/or stability.

Those having the requisite skill in the art of refining techniques will recognize that the fluid catalytic cracking process makes use of an integrated regeneration system. Prior to being passed into the regenerator, the catalyst from the reactor is passed through a stripper which utilizes steam for the removal of hydrocarbonaceous material. This type process may be exemplified by U.S. Pat. No. 2,833,699 (Cl. 208–150). The described technique employs a steam jet, for the purpose of blasting the spent catalyst as it initially enters the stripping zone, followed by the more conventional stripping operation. That is, as the catalyst passes through the stripping zone, it is first contacted by the high-pressure steam jet and, as it collects at the bottom of the vessel, is contacted with steam as a dense-phase, fluidized bed, in the conventional manner.

One other prior art technique, which is also directed to the fluid catalytic cracking process, is that disclosed in U.S. Pat. No. 2,688,195 (Cl. 34–57). This is another variation of catalyst stripping with steam, and is accomplished by alternate conditions of compression and expansion of the fluidized catalyst bed. This, in turn stems from an equipment design and apparatus configuration which increases and decreases the velocity of the steam. This compression and expansion of the fluidized catalyst bed is not a cycling of the static pressure, since the pressure must always be decreasing as the steam flows upwardly through the catalyst. Without the continuing decrease in the pressure, there would be no flow of steam through the catalyst.

Significantly, none of the prior art techniques, and particularly those briefly described above, either singly, or in combination, recognize the low, static-pressure cycling technique of the present invention which insures substantially complete removal of both hydrogen and hydrocarbons from a catalyst intended for oxidative regeneration, or the removal of oxygen from regenerated catalyst, without effecting fluidization thereof within the purging zone.

OBJECTS AND EMBODIMENTS

One object of my invention is to provide a method for purging volatile materials from a hydrocarbon conversion catalyst. More specifically, it is an object to provide a method for purging hydrogen and hydrocarbons from a reforming catalyst. In those instances wherein a purging zone is used with catalyst particles passing into and out of the zone, it is an object to present a purging operation which will cause volatile material to be purged from the catalyst particles without fluidizing the particles within the purging zone.

A more specific object is directed toward the removal of hydrogen and hydrocarbonaceous material from catalyst particles withdrawn from a hydrogenative hydrocarbon conversion zone for ultimate transport to an oxidative catalyst regeneration system existing in on-stream relationship with said hydrocarbon conversion zone. A corollary objective is to provide a catalyst purging method for use in an integrated hydrogenative conversion/oxidative regeneration system, through which catalyst particles are movable via gravity-flow.

Therefore, in a hydrogenative hydrocarbon conversion process, having an on-stream oxidative catalyst regeneration system, wherein catalyst particles are withdrawn from a hydrocarbon conversion zone and transported to said catalyst regeneration system, and withdrawn from said regeneration system and transported to a hydrocarbon conversion zone, one embodiment of my invention encompasses the method of purging volatile material from said catalyst particles, in a purging zone, prior to the transport thereof to said regeneration system, or to said hydrocarbon conversion zone, which method comprises the sequential steps of: (a) introducing said catalyst particles into said purging zone and establishing therein a first static pressure level; (b) introducing an inert gaseous medium into said purging zone while simultaneously increasing the static pressure to a predetermined, second level, also simultaneously venting volatile material and said inert gaseous medium from said purging zone; (c) when said predetermined, second static pressure level is attained, ceasing the flow of said gaseous medium; (d) continuing the venting of volatile material and inert gaseous medium while said static pressure decreases to said first pressure level; and, (e) repeating the sequence of steps (b), (c) and (d) from one to about six times; said method being further characterized in that said first and second static pressure levels are attained throughout the sequential steps without effecting fluidization of said catalyst particles in said purging zone.

In another embodiment, the preferred inert gaseous medium is nitrogen. A more limited embodiment encompasses a first static pressure level in the range of about zero to about 5.0 psig. and a second static pressure level in the range of about 5.0 to about 20.0 psig.

Other objects and embodiments will become evident from the following more detailed description of the purging method encompassed by my inventive concept. In one such other embodiment, the increase in static pressure is effected over a time period of from 10 to about 60 seconds. Likewise, the decrease in static pressure is effected over a time period from 10 to about 60 seconds.

SUMMARY OF INVENTION

While the purging method herein described can be advantageously applied to any system wherein volatile matter is to be removed from a hydrocarbon conversion catalyst, the improved method is particularly applicable in removing hydrogen and hydrocarbons from conversion catalysts utilized in processes including hydrocracking, reforming, hydrogenation, dehydrogenation, dealkylation, desulfurization, etc.

The present improvement is particularly wellsuited for the removal of hydrogen and hydrocarbonaceous material from a reforming catalyst, prior to the regeneration thereof, and for the removal of oxygen prior to the return thereof to the reforming system. Such catalysts are well known to those trained in the art, and generally comprise a platinum-group metal, combined halogen and alumina. Particularly preferred is a spherical catalyst comprising platinum and chlorine composited with alumina. It is to be understood, however, that the present purging method is not to be limited to this particular catalyst, and other platinum-group metals may be suitably employed. Further, the platinum-group, metal-containing catalyst may contain a catalytic modifier such as rhenium, tin and/or germanium. In like manner, other refractory inorganic oxides including silica, zirconia, boria, thoria, silicaalumina, etc., are applicable. However, the novelty of the present purge technique does not reside in the catalyst per se, although the technique is particularly well-suited to a reforming embodiment.

Catalytic reforming reactions are effected at conditions including a temperature of about 700° to about 1,000°F., a pressure of about 50 psig. to about 1,000 psig., a liquid hourly space velocity of about 0.2 to about 10.0 and a hydrogen to hydrocarbon mole ratio of about 1.0:1.0 to about 10.0:1.0. In a continuous, or semi-continuous reforming operation, as exemplified by those United States Patents previously set forth, the catalyst is removed from a reaction zone and contains both adsorbed hydrogen and hydrocarbonaceous material.

This hydrogen and naphtha is removed by contacting the catalyst, in a batch receptable, or purging zone, with a relatively inert gaseous medium. Preferably, the flowing gas contacts the catalyst particles in an upflow direction through the purging zone. By the term "relatively inert" is means a gas such as nitrogen, helium, argon, etc., which is inert at purge conditions and which is not absorbed on the catalyst to the detriment of subsequent steps. For these reasons, nitrogen is especially preferred. Similarly, "volatile materials" refers to compounds which are removable by purging operations, and include normally liquid hydrocarbons such as naphtha or heavier materials, and normally vaporous material such as methane, ethane, propane, butane and pentane. With respect to the purging of regenerated catalyst particles, the volatile material is principally oxygen. The present invention embodies cycling the static pressure within the purging zone by first increasing the same, while maintaining a continuous flow of inert gas, to a predetermined level. The exact pressure to be attained can be determined by either an absolute pressure control, or a control on the exact volume of gas which must be incrementally added to reach that pressure. Preferably, the higher, predetermined pressure is at least about twice, or three times the initial purge pressure. Accordingly, when the purge is effected at atmospheric pressure, up to about 5.0 psig., the static pressure is increased to a level of from 5.0 to about 20.0 psig. When the pressure reaches the predetermined level, the pressure is then lowered, preferably to the initial pressure. While the flow of purge gas may be continued during the depressurization sequence, it is preferred that the purge gas flow be terminated during this step. The sequence of static pressure cycling, particularly when repeated from about one to six times, insures that the purge gas reaches all parts of the chamber, or zone in which the catalyst is contained and concomitantly removes essentially all of the volatile material from the catalyst in purge times significantly lower than now available. In a typical commercial embodiment, the pressurization step is effected over a time period of about 10 seconds to about 60 seconds; the depressurization step is similarly effected over a period of about 10 seconds to about 60 seconds. The improved purge technique embodied in the present invention can be best illustrated by reference to the following example which illustrates the removal of hydrogen and naphtha from a spent reforming catalyst withdrawn from a reforming reaction zone while on-stream and which is to be ultimately regenerated.

The catalyst, comprising platinum, rhenium and halogen, combined with an alumina support, is removed from the reaction section at a temperature of about 950°F. to about 1,000°F. and a pressure of about 200 psig., and is contacted in a transfer conduit with a countercurrently flowing hydrogen or reformer recycle gas stream. This hydrogen or reformer recycle gas stream cools the catalyst to a temperature of about 200°F. and purges most of the naphtha from the catalyst. About 50 to about 200 pounds of the catalyst is then charged to a catalyst lock hopper and depressured to about atmospheric pressure. The lock hopper comprises a cylindrical vessel with a conical bottom section and has a nitrogen purge which enters through the bottom section. A vent line, containing a restriction orifice to effect a pressure increase, exits from the top of the lock hopper.

The hydrogen and naphtha are removed from the catalyst by initiating a nitrogen purge. With the vent line open, a volume of gas equal to the volume of the lock hopper is added over a period of about 35 seconds. This raises the pressure to about 12 psig. At the end of this time period, the nitrogen flow entering the lock hopper is terminated and the pressure allowed to return to about atmospheric over a time period of about 35 seconds. During this operation, a vent gas containing the purge gas and volatile material removed from the catalyst is withdrawn from the lock hopper. This sequence of static-pressure cycling with nitrogen is then repeated two more times before the catalyst, now substantially free of hydrogen and naphtha, is removed and transferred to a regeneration section.

At the end of this purge sequence, the catalyst contains less than about 0.25% to about 0.50% by weight of volatile material. If the same volume of nitrogen utilized in the three step purge sequence were added in a continuous manner, over the same time period, the catalyst would contain about 2.0% to about 3.0% by weight of volatile material. Hence, the technique embodied in the present invention more efficiently removes volatile material from a spent reforming catalyst.

I claim as my invention:

1. In a hydrogenative hydrocarbon conversion process, having an on-stream oxidative catalyst regeneration system, wherein catalyst particles are withdrawn from a hydrocarbon conversion zone and transported to said catalyst regeneration system, and withdrawn from said regeneration system and transported to a hydrocarbon conversion zone, the method of purging volatile material from said catalyst particles, in a purging zone, prior to the transport thereof to said regeneration system, or to said hydrocarbon conversion zone, which method comprises the sequential steps of:
   a. introducing said catalyst particles into said purging zone and establishing therein a first static pressure level;
   b. introducing an inert gaseous medium into said purging zone while simultaneously increasing the static pressure to a predetermined, second level, over a time period in the range of about 10 to about 60 seconds also simultaneously venting volatile material and said inert gaseous medium from said purging zone;
   c. when said predetermined, second static pressure level is attained, ceasing the flow of said inert gaseous medium;
   d. continuing the venting of volatile material and inert gaseous medium while said static pressure decreases to said first pressure level over a time period in the range of about 10 to about 60 seconds; and,
   e. repeating the sequence of steps (b), (c) and (d) from 1 to about 6 times;

said method being further characterized in that said first and second static pressure levels are attained throughout the sequential steps without effecting fluidization of said catalyst particles in said purging zone, said first static pressure level being in the range of about 0 to about 5 psig. and said second static pressure level being in the range of about 5 to about 20 psig.

2. The method of claim 1 further characterized in that said inert gaseous medium is nitrogen.

3. The method of claim 1 further characterized in that said inert gaseous medium flows upwardly through said purging zone.

4. The method of claim 1 further characterized in that said volatile material comprises hydrogen and hydrocarbonaceous material.

5. The method of claim 1 further characterized in that said volatile material comprises oxygen.

* * * * *